Oct. 8, 1957 W. M. EVANS 2,809,309
TORQUE RESPONSIVE BRAKE SYSTEM
Filed May 10, 1954 2 Sheets-Sheet 1
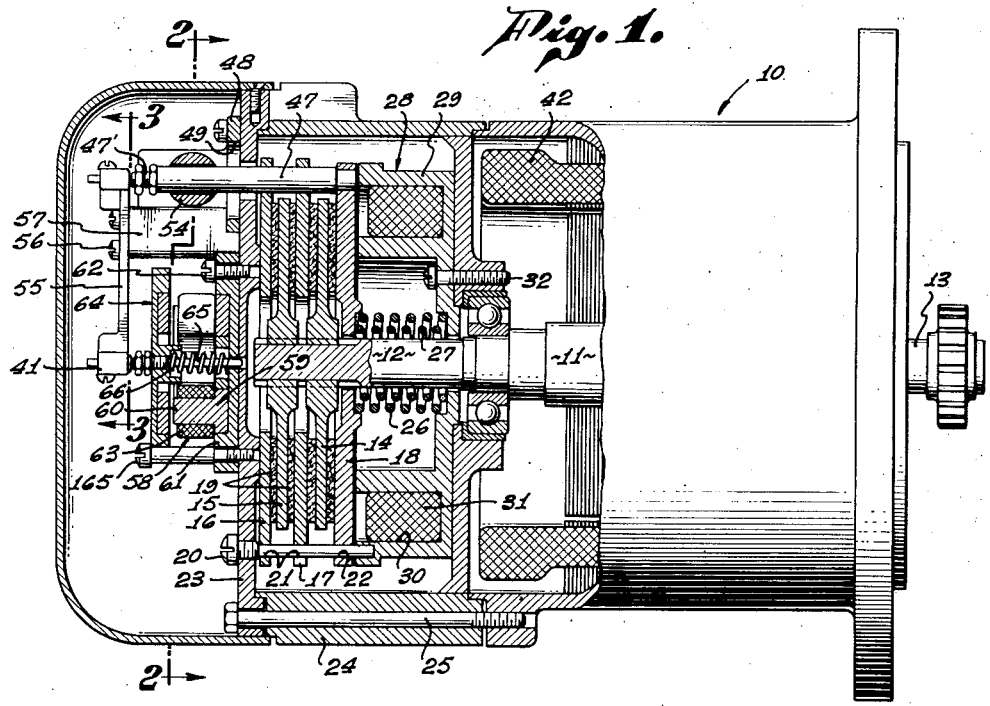
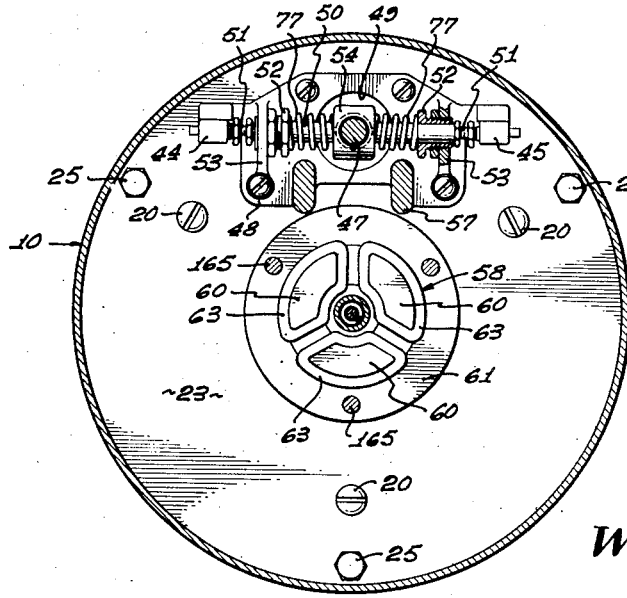
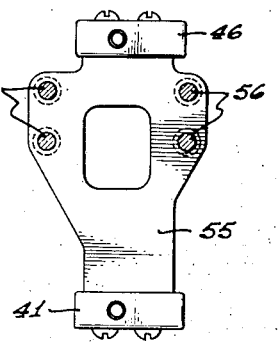
INVENTOR.
WILLIAM M. EVANS,
BY
Flam and Flam
ATTORNEYS.

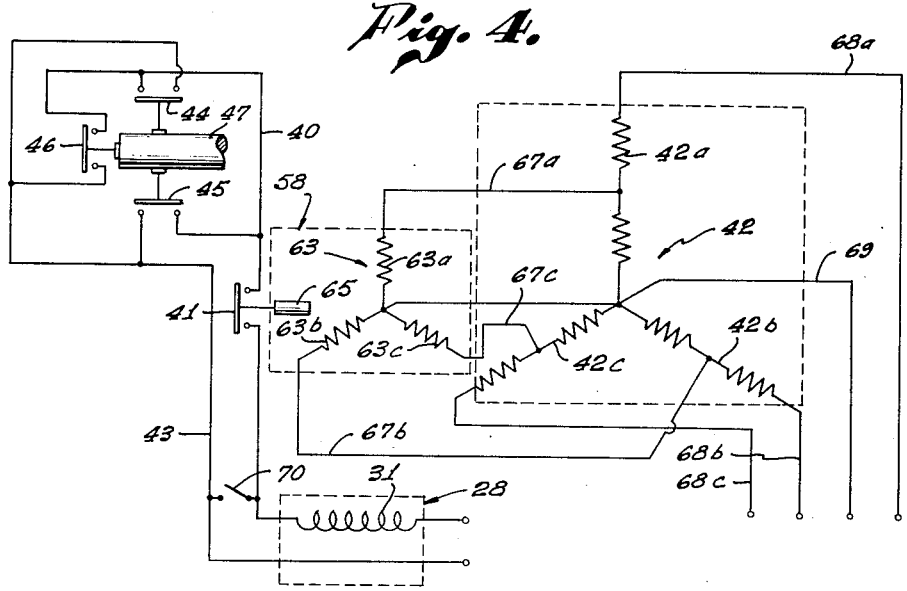
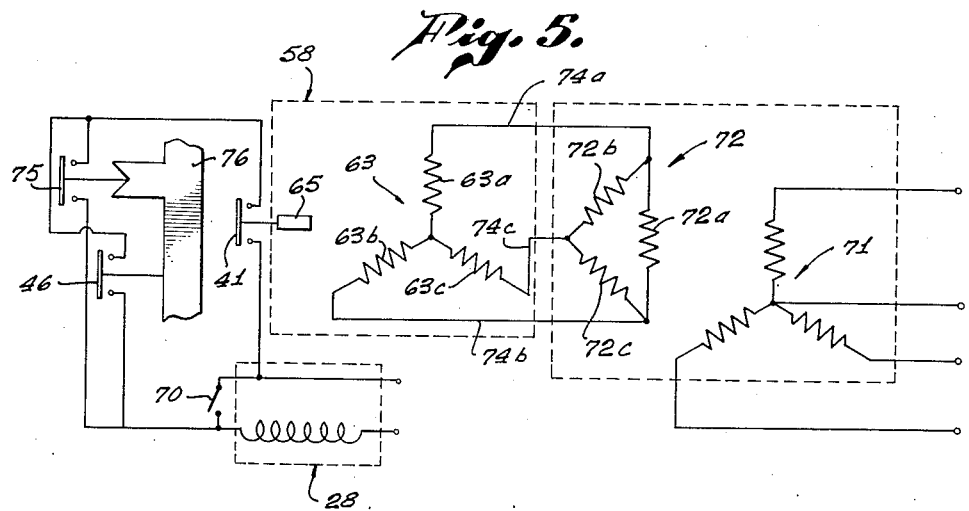
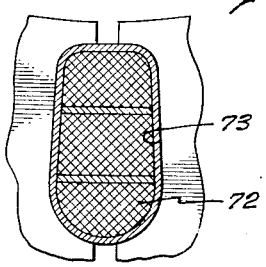
INVENTOR.
WILLIAM M. EVANS,
BY
Flam and Flam
ATTORNEYS.

United States Patent Office

2,809,309
Patented Oct. 8, 1957

2,809,309

TORQUE RESPONSIVE BRAKE SYSTEM

William M. Evans, La Habra, Calif., assignor to U. S. Electrical Motors, Inc., Los Angeles, Calif., a corporation of California Application May 10, 1954, Serial No. 428,660

20 Claims. (Cl. 310—77)

This invention relates to a brake for an electric motor or the like, operation of the brake being determined in accordance with the operating characteristics of the motor.

It is an object of the present invention to provide a simple and novel brake that is released only upon the development of a predetermined starting torque by the motor.

The brake is normally urged to applied position by biasing springs, and moved to released position by an electromagnet structure. It is another object of this invention to provide a brake of this character in which the energization of the electromagnet is dependent upon the continued energization of the motor, such that the brake will be applied as soon as the motor is deenergized.

By deriving power for the electromagnet through the motor windings, either by induction or by direct connection, not only is this dependency satisfied, but also an additional controlling feature is introduced. Thus, the brake is applied in the event of partial or total failure of the motor windings despite attempted energization of the motor.

It is another object of this invention to provide a compact motor-brake structure as well as novel actuating means for effecting the various controls.

This invention possesses many other advantages, and has other objects which may be made more clearly apparent from a consideration of several embodiments of the invention. For this purpose there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings:

Figure 1 is a longitudinal sectional view of a motor brake unit embodying the present invention, part of the motor being shown in elevation;

Fig. 2 is a sectional view, taken along a plane indicated by line 2—2 of Figure 1;

Fig. 3 is a view of a switch mounting bracket, utilized in connection with the unit, and taken in a direction corresponding to the plane indicated by line 3—3 of Fig. 1;

Fig. 4 is a schematic diagram showing the circuit arrangement for the motor-brake unit;

Fig. 5 is a schematic diagram similar to Fig. 4, but showing a modified circuit arrangement, and diagrammatically illustrating a slightly different form of actuator for the torque responsive switch; and Fig. 6 is a fragmentary sectional view of the motor stator showing the arrangement of windings in the stator slots to achieve the circuit arrangement of Fig. 5.

A three-phase motor accommodated in a casing 10 has a shaft 11 provided with an extension 12 projecting beyond the windings of the motor in a direction opposite the take-off end 13. The extension 12 carries for rotation therewith a pair of spaced apart rotary brake discs 14 and 15. For this purpose, the discs 14 and 15 have central apertures interfitting a splined portion of the shaft extension 12. This connection permits longitudinal movement of the discs along the shaft extension 12.

The discs 14 and 15 are interspaced between three non-rotary brake discs 16, 17, and 18 that are also movable axially of the shaft extension 12. Annular brake lining elements 19 are bonded to the sides of the discs frictionally to connect all of the discs when urged together. The non-rotary brake elements are guided for movement axially of the extension 12 by the aid of unthreaded extended shanks of equiangularly spaced machine screws 20. The shanks engage correspondingly situated apertures 21 near the peripheries of two of the non-rotary discs 16 and 17, and slots 22 at the periphery of the innermost brake disc 18. The machine screws 20 are carried upon a plate 23 closing an end opening of a hollow housing bracket 24. Long cap screws 25 threadedly engaging lugs of the motor casing 10 hold the plate 23 and bracket 24 in assembled relationship with the motor casing 10.

Outward movement of the brake discs is limited by engagement of the outermost non-rotary brake disc 16 with the plate 23. A pair of concentric compression springs 26 and 27 extending about the shaft extension 12 engage the innermost non-rotary brake disc 18 and urge the brake discs together, causing the shaft 11 to be restrained against angular movement.

To release the brake, an electromagnet 28 is provided, located within the bracket 24 adjacent the motor proper. The electromagnet 28 comprises an annular shell structure 29 made of magnetic material, and forming an annular recess 30, and an electromagnetic coil 31 in the recess. The end disc 18 is made of magnetic material, and opposes the polar areas formed at the end of the shell 29 whereby, upon energization of the electromagnet 28, the brake discs are separated against the force of the compression springs 26 and 27, causing shaft 11 to be released.

The electromagnet 28 is held in place by cap screws 32 extending through the central web portion of the shell 29, and threadedly engaging the bracket 24. The shell 29 conveniently forms a seat for the compression springs 26 and 27.

The energization circuit for the brake coil 31 is shown in Fig. 4. One terminal of the coil 31 is connected to a power supply line, preferably direct-current. The other terminal connects with a lead 40 in which is interposed a normally open relay operated switch 41. This switch is caused to close only upon energization of the motor windings 42. Accordingly, whenever energization of the motor is discontinued, the brake is applied, substantially immediately stopping the motor. The manner in which this switch is operated will be described more fully hereinafter.

Another lead 43 connects directly with the other direct-current power supply line. The leads 40 and 43 may be connected together to complete the circuit for the brake coil 31 by operation of any one of three circuit controllers or switches 44, 45, and 46, the switches being arranged in parallel. These switches may be of the microswitch type.

One of the switches 44 or 45 closes upon the development of a predetermined starting torque by the motor, to insure against rotation of the shaft 11 unless a substantial starting torque is available. To accomplish this purpose, an actuator arm 47 for the switches 44 and 45 is provided that is movable in accordance with the torque developed by the motor prior to starting.

The actuator arm is disposed between the switches 44 and 45, the switches being symmetrically arranged. If the motor develops a sufficient starting torque in one direction, the actuator arm moves to close the switch 44, causing the brake to be released; if the motor develops a sufficient starting torque in the other direction, the actuator arm moves to close the switch 45, also causing the brake to be released.

Such movement of the actuator arm 47 is accomplished by mounting it upon the brake disc 18. This brake disc 18 is permitted to move angularly within small limits corresponding to operation of the respective switches 44 and 45 by virtue of slight clearance between the shanks of screws 20 and the slots 22 mounting the disc 18. The rotary force applied on the disc 18 by the rotary disc 14 when the brake is applied, and the motor energized, serves to move the disc 18 toward one or the other limited position in accordance with the direction of intended rotation of the motor.

A mounting bracket 48 for the switches 44 and 45 is secured upon the plate 23, and has a central aperture 49 through which the actuator arm 47 passes. A stem 50 extending transversely of the actuating arm 47 adjustably mounts pins 51 cooperable with the switches proper. The stem 50 is guided for longitudinal movement substantially normal to the actuating arm 47 by passing through externally threaded sleeves 52 adjustably carried by lugs 53 formed on the switch bracket 48.

The stem 50 has an enlarged central portion 54 having a transverse guiding aperture through which the actuating arm 47 extends. By virtue of this interconnection between the stem 50 and the actuating arm 47, longitudinal movement of the arm 47 together with the armature disc 18 is permitted without affecting the switches 44 and 45.

The actuating arm 47 as well as the armature brake disc 18 are maintained in an angularly central position by the aid of a pair of centralizing compression springs 77. Each spring extends about the stem 50 and engages at opposite ends the corresponding adjustable sleeve 52 and the enlarged central portion 54 of the stem 50. By adjusting the position of the sleeves 52 relative to each other a central position of the actuating arm 47 is determined in which both switches 44 and 45 are open.

The centralizing springs 77 resiliently oppose angular movement of the actuating arm 47 and armature brake disc 18 from the preset central position. The centralizing springs permit the actuating arm 47 and armature brake disc 18 to move from the central position an amount directly proportional to the torque imposed upon the brake. The predetermined movement of the actuator arm 47 to close one of the switches 44 or 45 (depending upon the adjusted positions of the pins 51) thus corresponds to the development of a definite starting torque.

The brake coil 31 is then energized, through either switch 44 or 45, retracting the armature brake disc 18 and releasing the motor shaft 11, the relay operated switch 41 being closed. The non-rotary brake disc 18 no longer sustains the torque of the motor shaft 11, and it accordingly returns to a central position. Upon the return of the armature brake disc to its central position, the switch 44 or 45 is opened. However, the energization circuit for the brake coil 31 is maintained. For this purpose, the switch 46 acts as a holding switch which closes substantially immediately upon longitudinal retraction of the actuator arm 47 in response to initial energization of the electromagnet 28 to maintain the energization circuit therefor despite opening of the switch 44 or 45.

The holding switch 46 is mounted upon a bracket 55 (Fig. 3) that is accurately mounted upon the switch bracket 48 by four cap screws 56 passing through spacer blocks 57 and threadedly engaging the plate 23. A pin 47' adjustably mounted on the end of the actuating arm 47 cooperates with the switch proper to accomplish the switching function.

The relay operated switch 41 is secured upon a depending portion of the bracket 55 for cooperation with a three-phase relay 58 located axially of the motor and mounted exteriorly of the plate 23. The relay 58 comprises a core structure 59 providing three polar projections 60 equiangularly spaced about the axis of the relay. The core 59 is accommodated in an annular support 61 secured to the plate 23 as by cap screws 62. Coils 63 are mounted upon the polar projections 60. The projections 60 form polar areas extending in a common plane transverse to the axis of the device. An armature structure 64 cooperable with the polar areas is guided for movement toward and away from the polar projections 60 by the aid of pins 165 mounted upon the plate 23. The armature 64 adjustably mounts a pin 65 cooperable with the switch 41. The armature is urged away from the polar projections 60 in a direction normally to open the switch 41 by a compression spring 66. The spring 66 at one end is seated in a central recess of the armature 64, and at the other end is in engagement with the relay core support 61. An inward extension of the pin 65 extends through the spring 66, and is piloted in aligned recesses of the relay core support 61 and the plate 23.

The three phase windings 63a, 63b, and 63c of the relay 58 derive power through the respective three phase stator windings 42a, 42b, and 42c of the motor. In the form shown in Fig. 4, leads 67a, 67b, and 67c connect the respective relay windings 63 to midpoints of the respective motor windings 42. Leads 68a, 68b, and 68c, as well as a neutral lead 69, are provided for the motor windings 42.

All of the relay windings 63 must be energized in order to move the armature 64 to attracted position. Accordingly, the switch 41 remains open to keep the brake applied in the event that all motor connections are not properly made. If all motor connections are properly made, the switch 41 closes, transferring control of the brake coil circuit to the switches 44, 45, and 46. As heretofore described, these switches operate to release the motor shaft 11 upon the existence of a predetermined starting torque.

A manual overriding switch 70 is provided so that the brake can be released if necessary or desirable.

Since the force required to hold the relay armature 64 in attracted position is substantially less than that required to move the armature to attracted position, the apparatus can be designed so that upon inadvertent disconnection of only one of the motor leads 68 during operation, or upon failure of one of the motor windings during operation, the relay 58 nevertheless maintains the switch 41 closed, thereby permitting the motor to continue operation. However, the relay 58 opens the switch 41 to cause the brakes to be applied in the event that two or all of the motor windings are ineffective, intentionally or otherwise, either through failure of the motor windings or through disconnection of the motor leads from the source of power.

The apparatus can be designed, if desired, to release the armature 64 and open the switch 41 in the event that any one of the motor leads 68 becomes disconnected, or any one of the motor windings fails.

In the form shown in Fig. 5, the relay 58 is provided as before. In this instance, the relay windings 63 derive energy from the motor windings 71 by induction rather than direction connection. For this purpose, delta connected transformer windings 72a, 72b, and 72c are inductively associated with the motor windings, and wound in the lowermost portions of the stator slots 73 (Fig. 6). Leads 74a, 74b, and 74c connect the transformer windings 72 with the relay windings 63.

In the present form, there is also diagrammatically illustrated a slightly different form of control circuit for the brake electromagnet 28. A single circuit controller or switch 75 performs the functions of both switches 44 and 45 of the previous form. The switch 75 is essentially a toggle switch closed upon movement of an actuator arm 76 in one direction or the other depending upon the direction of intended rotation of the motor. The holding switch 46 and manual overriding switch 70 are provided as in the previous form.

The inventor claims:

1. In combination: a rotary member; relatively non-rotary brake means movable between two positions respectively for restraining and releasing said rotary member; said brake means also being movable in a direction having a component extending arcuately of the axis of rotation of said rotary member; electrically energizable means for moving the brake means to one position; and a circuit controller operated by movement of said brake means in said direction for controlling the electrically energizable means.

2. In combination: a rotary member; relatively non-rotary brake means movable between two positions respectively for restraining and releasing said rotary member; said brake means also being movable in a direction having a component extending arcuately of the axis of rotation of said rotary member; electrically energizable means for moving the brake means to one position; means for moving the brake means to the other position; a circuit controller operated by movement of the brake means in said direction for conditioning the electrically energizable means for operation; and a second circuit controller for maintaining the electrically energizable means in condition for operation and operated in response to movement of said brake means by said electrically energizable means.

3. In combination: a rotary member; relatively non-rotary brake means movable axially of said rotary member between two positions respectively for restraining and releasing said rotary member; means mounting said brake means for movement angularly about the axis of said rotary members; electrically energizable means for moving said brake means to releasing position; yielding biasing means moving said brake means to restraining position; a circuit controller operated by angular movement of said brake means for conditioning said electrically energizable means for operation; and a second circuit controller operated by movement of said brake means to releasing position to maintain said electrically energizable means in condition for operation.

4. In combination: a rotary member; relatively non-rotary brake means movable between two operative positions respectively for restraining and releasing said rotary member; means mounting the brake means for angular movement about the axis of said rotary member, said angular movement of said brake means being ineffective to release or restrain said rotary member; means resiliently urging the brake means to one angular position; electrically energizable means for moving the brake means to one operative position; means moving the brake means to the other operative position; and a circuit controller operated upon predetermined angular movement of said brake means away from said one angular position for controlling said electrically energizable means.

5. In combination: a rotary member; relatively non-rotary brake means movable between two operative positions respectively for restraining and releasing said rotary member; means mounting the brake means for angular movement about the axis of said rotary member, said angular movement of said brake means being ineffective to release or restrain said rotary member; means resiliently urging the brake means to one angular position; electrically energizable means for moving the brake means to releasing position; means moving the brake means to restraining position; a first circuit controller operated upon a predetermined angular movement of said brake means away from said one angular position for conditioning said electrically energizable means for operation; and a second circuit controller paralleling said first circuit controller operated upon movement of said brake means to releasing position.

6. In combination: a rotary member; relatively non-rotary brake means movable between two operative positions respectively for restraining and releasing said rotary member; means mounting the brake means for angular movement about the axis of said rotary member, said angular movement of said brake means being ineffective to release or restrain said rotary member; means resiliently urging the brake means to a central angular position; electrically energizable means for moving the brake means to releasing position; means for moving the brake means to restraining position; and circuit controlling means operated upon predetermined angular movement of said brake means away from said central angular position for conditioning said electrically energizable means for operation.

7. In combination: a rotary member; relatively non-rotary brake means movable between two operative positions respectively for restraining and releasing said rotary member; means mounting the brake means for angular movement about the axis of said rotary member, said angular movement of said brake means being ineffective to release or restrain said rotary member; means resiliently urging the brake means to a central angular position; electrically energizable means for moving the brake means to releasing position; means for moving the brake means to restraining position; circuit controlling means operated upon predetermined angular movement of said brake means away from said central angular position for conditioning said electrically energizable means for operation; and second circuit controlling means paralleling said first mentioned circuit controlling means for maintaining said electrically energizable means in condition for energization upon movement of said brake means to releasing position.

8. In combination: a rotary member; electrically energizable means for rotating said rotary member; relatively non-rotary brake means movable between two positions for restraining and releasing said rotary member; yielding means for moving said brake means to restraining position; electrically energizable means for moving said brake means to releasing position; a circuit controller; and an energization circuit for said electrically energizable moving means, the completion of which is dependent upon energization of said rotating means and is also dependent upon said circuit controller, said circuit controller being operative in response to the existence of a predetermined torque applied to the brake means through the rotary member.

9. In combination: a rotary member; electrically energizable means for rotating said rotary member; relatively non-rotary brake means movable between two positions for restraining and releasing said rotary member; yielding means for moving said brake means to restraining position; electrically energizable means for moving said brake means to releasing position; a first circuit controller; an energization circuit for said electrically energizable moving means, the completion of which is dependent upon energization of said rotating means and is also dependent upon said first circuit controller, said first circuit controller being operative in response to the existence of a predetermined torque applied to the brake means through the rotary member; and a second circuit controller paralleling said first circuit controller and operated in response to movement of said brake means to releasing position.

10. In combination: a rotary member; an electric motor for rotating said rotary member, and having windings adapted to be connected to a source of electrical energy; relatively non-rotary brake means movable between two positions for restraining and releasing said rotary member; yielding means for moving said brake means to restraining position; electrically energizable means for moving said brake means to releasing position; and an energization circuit for said electrically energizable means including a first circuit controller and a second circuit controller; electrically energizable means having a circuit including said windings for moving said first circuit controller to circuit closing position; and means for closing said second circuit controller in response to the existence of a predetermined torque applied to the brake means through said rotary member.

11. In combination: a rotary member; an electric motor for rotating said rotary member, and having windings adapted to be connected to a source of electrical energy; relatively non-rotary brake means movable between two positions for restraining and releasing said rotary member; yielding means for moving said brake means to restraining position; electrically energizable means for moving said brake means to releasing position; and an energization circuit for said electrically energizable means including a first circuit controller and a second circuit controller; electrically energizable means having a circuit including a winding inductively associated with said motor windings for moving said first circuit controller to circuit closing position; and means for closing said second circuit controller in response to the existence of a predetermined torque applied to the brake means through said rotary member.

12. In combination: a rotary member; an electric motor for rotating said rotary member and having multiple phase windings; relatively non-rotary brake means movable between two positions for restraining and releasing said rotary member; yielding means for moving said brake means to restraining position; electrically energizable means for moving said brake means to releasing position; an energization circuit for said electrically energizable means, including a circuit controller; a multiple phase relay for operating said circuit controller and having multiple phase circuit means respectively dependent upon the energization of the multiple phase windings of said motor; and biasing means opposing the operation of said circuit controller, and exerting a force the value of which is predetermined in accordance with the holding force of said relay when operated by a number of its circuit means.

13. In combination: a rotary member; an electric motor for rotating said rotary member and having multiple phase windings; relatively non-rotary brake means movable between two positions for restraining and releasing said rotary member; yielding means for moving said brake means to restraining position; electrically energizable means for moving said brake means to releasing position; an energization circuit for said electrically energizable means, including a circuit controller; a multiple phase relay for operating said circuit controller and having multiple phase circuit means respectively dependent upon the energization of the multiple phase windings of said motor; and biasing means opposing the operation of said circuit controller, and exerting a force less than the holding force of said relay when said relay is operated by all but one of its multiple phase circuit means.

14. In combination: a rotary member; an electric motor for rotating said rotary member and having multiple phase windings; relatively non-rotary brake means movable between two positions for restraining and releasing said rotary member; yielding means for moving said brake means to restraining position; electrically energizable means for moving said brake means to releasing position; an energization circuit for said electrically energizable means, including a circuit controller; a multiple phase relay for operating said circuit controller and having multiple phase circuit means respectively dependent upon the energization of the multiple phase windings of said motor; and biasing means opposing the operation of said circuit controller, and exerting a force less than the holding force of said relay when said relay is operated by only some of its multiple phase circuit means.

15. In combination: a rotary member; relatively non-rotary brake means movable axially of the rotary member for restraining and releasing the rotary member; means supporting the brake means for limited movement angularly about the axis of said rotary member; electrically energizable means for moving the brake means in one axial direction for releasing said rotary member; yielding means urging said brake means in the other axial direction; a pair of circuit controllers for controlling said electrically energizable means; an actuator carried by said brake means and operatively connected to said circuit controllers; angular movement of said brake means and actuator closing one of said circuit controllers, and axial movement of said brake means and actuator to releasing position closing the other of said circuit controllers.

16. In combination: a rotary member; brake means for restraining movement of the member; said brake means being movable in one path to applied and released position; said brake means being movable in a second path in response to torque exerted on said brake means when said brake means is applied; selectively operated means for moving said brake means to one position in said one path; biasing means urging the brake means to the other position in said one path; means responsive to movement of said brake means in said second path for conditioning the selectively operated means for operation; and controlling means operable upon movement of said brake means to said one position in said one path and dependent upon continued operation of said rotary member for maintaining said selectively operated means operative.

17. In combination: a support; spaced axially aligned guiding sleeves each adjustably mounted on the support for movement in an axial direction; a stem having ends slidably movable in the sleeves; said stem having a transverse aperture intermediate its length as well as abutment means; pins carried by the ends of the stem; circuit controllers mounted on the support and operable upon sufficient advancement of the ends of said pins respectively; an actuating arm slidably received in said stem aperture; and compression springs surrounding opposite ends of the stem and each engaging the abutment means at corresponding inner ends and each engaging the corresponding sleeves at their outer ends.

18. In combination: a support; spaced axially aligned guiding sleeves each adjustably mounted on the support for movement in an axial direction; a stem having ends slidably movable in the sleeves; said stem having a transverse aperture intermediate its length as well as abutment means; pins projecting beyond the ends of said stem and mounted thereon for longitudinal adjustment; circuit controllers mounted on the support and operable upon sufficient advancement of the ends of said pins respectively; an actuating arm slidably received in said stem aperture; and compression springs surrounding opposite ends of the stem and each engaging the abutment means at corresponding inner ends and each engaging the corresponding sleeves at their outer ends.

19. In combination: a support; spaced axially aligned guiding sleeves each adjustably mounted on the support for movement in an axial direction; a stem having ends slidably movable in the sleeves; said stem having a transverse aperture intermediate its length as well as abutment means; pins carried by the ends of the stem; circuit controllers mounted on the support and operable upon sufficient advancement of the ends of said pins respectively; an actuating arm slidably received in said stem aperture; compression springs surrounding opposite ends of the stem and each engaging the abutment means at corresponding inner ends and each engaging the corresponding sleeves at their outer ends; a supplementary bracket fixed with respect to said first bracket; a pin projecting beyond the end of said actuator; and a circuit controller carried by said supplementary bracket and operable upon sufficient longitudinal movement of the pin projecting beyond the end of said actuator.

20. In combination: a support; spaced axially aligned guiding sleeves each adjustably mounted on the support for movement in an axial direction; a stem having ends slidably movable in the sleeves; said stem having a transverse aperture intermediate its length as well as abutment means; pins projecting beyond the ends of said stem and mounted thereon for longitudinal adjustment; circuit controllers mounted on the support and operable upon sufficient advancement of the ends of said pins respectively; an actuating arm slidably received in said stem aperture; compression springs surrounding opposite ends of the stem and each engaging the abutment means at corresponding inner ends and each engaging the corresponding sleeves at their outer ends; a supplementary bracket fixed with respect to said first bracket; a pin projecting beyond the end of said actuator, and mounted thereon for longitudinal adjustment; and a circuit controller carried by said supplementary bracket and operable upon sufficient longitudinal movement of the pin projecting beyond the end of said actuator.

References Cited in the file of this patent

UNITED STATES PATENTS

| | | |
|---|---|---|
| 950,224 | Dickinson | Feb. 22, 1910 |
| 2,037,735 | Oberhoffken | Apr. 21, 1936 |
| 2,257,611 | Lillquist | Sept. 30, 1941 |
| 2,274,356 | Blankenbuehler | Feb. 24, 1942 |
| 2,520,204 | Hancock | Aug. 29, 1950 |
| 2,628,321 | Anderson | Feb. 10, 1953 |
| 2,755,396 | Lee et al. | July 17, 1956 |

FOREIGN PATENTS

| | | |
|---|---|---|
| 133,718 | Great Britain | Oct. 23, 1919 |